(12) United States Patent
Efimov (10) Patent No.: US 7,088,483 B1
(45) Date of Patent: Aug. 8, 2006

(54) HOLOGRAPHIC SPATIAL LASER BEAM SHAPER AND METHOD

(75) Inventor: Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/054,730

(22) Filed: Feb. 10, 2005

(51) Int. Cl.
    *G02B 5/32* (2006.01)
(52) U.S. Cl. ............... 359/15; 359/569; 359/572; 385/37
(58) Field of Classification Search ............... 359/15, 359/569, 572; 385/37
    See application file for complete search history.

(56) References Cited

U.S. PATENT DOCUMENTS

| | | | |
|---|---|---|---|
| 3,826,561 A | 7/1974 | Gregg | |
| 4,673,257 A * | 6/1987 | Rokni et al. | 359/299 |
| 5,864,430 A | 1/1999 | Dickey et al. | |
| 5,925,271 A | 7/1999 | Pollack et al. | |
| 6,285,813 B1 * | 9/2001 | Schultz et al. | 385/37 |
| 6,421,390 B1 | 7/2002 | Burkhart | |
| 2002/0008091 A1 | 1/2002 | Brandinger et al. | |
| 2003/0123791 A1* | 7/2003 | Yu et al. | 385/24 |
| 2005/0226287 A1* | 10/2005 | Shah et al. | 372/25 |

FOREIGN PATENT DOCUMENTS

WO  WO 01/04685 A1  1/2001

OTHER PUBLICATIONS

Herwig Kogelnik, *Coupled Wave Theory for Thick Hologram Gratings*, The Bell System Technical Journal, Nov. 1969, pp. 2909-2945, vol. 48, No. 9, The American Telephone and Telegraph Company, New York.

K. Buse et al., *Origin of thermal fixing in photorefractive lithium niobate crystals*, The American Physical Society, Physical Review B, Jul. 15, 1997, pp. 1225-1235, vol. 56, No. 3.

S. Breer, K. Buse, *Wavelength demultiplexing with volume phase holograms in photorefractive lithium niobate*, Applied Physics B Laser and Optics, 1998, pp. 339-345.

M. Haner, W.S. Warren, *Synthesis of crafted optical pulses by time domain modulation in a fiber-grating compressor*, 1988 American Institute of Physics, Appl. Phys. Lett. 52(18), May 2, 1988, pp. 1458-1460.

(Continued)

Primary Examiner—Fayez G. Assaf
(74) Attorney, Agent, or Firm—Christie, Parker & Hale, LLP (57) ABSTRACT

A system and/or method for spatial beam shaping of an incident laser beam. The system and/or method includes a laser beam source for providing the incident laser beam and a Bragg grating (BG) coupled to receive the incident laser beam from the laser beam source. The BG has a thickness that is not less than a cross sectional size of the incident laser beam in the plane of beam diffraction. The BG produces a diffracted beam from the incident laser beam and the various depths within the BG include a distribution of diffraction efficiency density for spatially shaping the incident laser beam into the diffracted beam.

24 Claims, 6 Drawing Sheets

OTHER PUBLICATIONS

A.M. Weiner et al., *High-resolution femtosecond pulse shaping,* 1988 Optical Society of America, vol. 5, No. 8/Aug. 1988/J. Opt. Soc. Am. B, pp. 1563-1572.

Oleg M. Efimov et al., *High-efficiency Bragg gratings in photothermorefractive glass,* Optical Society of America, Applied Optics, Feb. 1, 1999, vol. 38, No. 4, pp. 619-627.

\* cited by examiner

HOLOGRAPHIC SPATIAL LASER BEAM SHAPER AND METHOD

FIELD OF THE INVENTION

The invention relates generally to the field of laser beam shaping and, more particularly, to a system and method that spatially shapes laser beams.

BACKGROUND OF THE INVENTION

Raw laser beams may be produced from a variety of mechanisms. It is known in the art that raw laser beams need to be spatially shaped in order to have proper applications in areas such as laser illumination, laser processing (e.g., laser machining), nonlinear optics, etc. For example, a beam shaper can be used to spatially shape a raw laser beam to produce a flat-top beam. This flattened laser beam can then be used in lithography, holography, spectroscopy, and for a variety of material machining purposes.

Currently, laser beams are spatially shaped by a number of approaches, such as a beam scanning across the processing (or needed) area approach, an approach for redistribution of beam intensity with an array of micromirrors, a local adjustment of the intensity of the different parts of the beam with an optically addressable spatial light modulator approach, or an approach for exploiting the Fourier transform properties of lenses in the case of Gaussian beams.

Some of these approaches can be categorized as active methods that require the application of complicated and expensive equipment to control the beam intensity that often results in considerable losses in beam power. On the other hand, passive methods, such as exploiting the Fourier transform properties of lenses require the application of a Gaussian beam profile and can be used only to form a few special output beam profiles.

Figure 1:
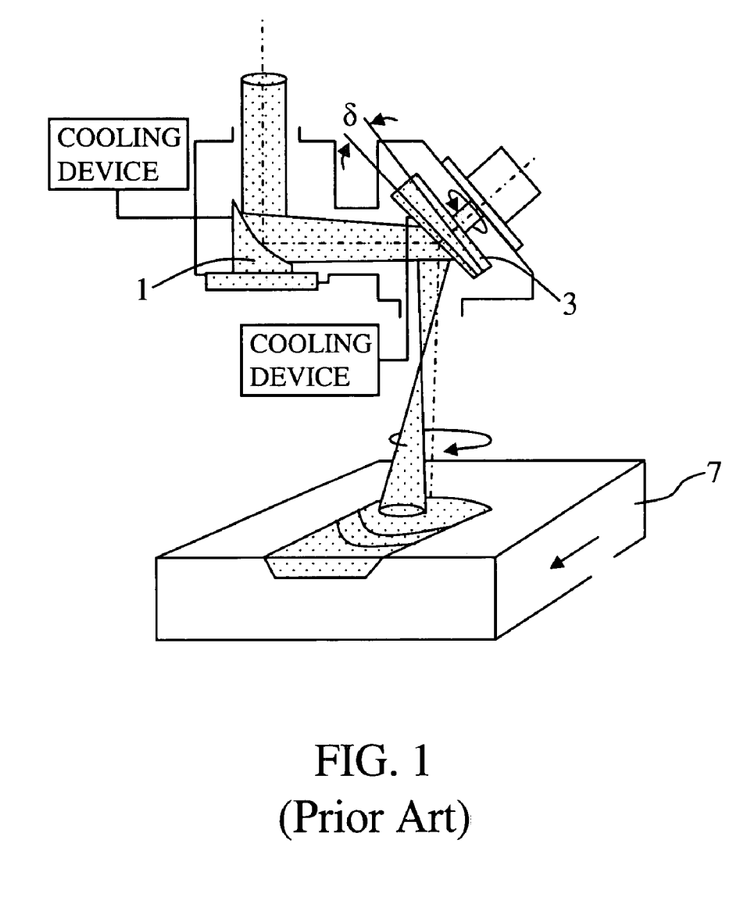
FIG. 1 is a schematic diagram of a device for laser beam surface machining.

In particular, a simple approach for spatial beam shaping is based on a method of scanning a laser beam across a processing area. This is actually a quasi-laser shaping approach because it only controls an integral dosage of irradiation without a real spatial shaping across the beam. One example of a device exploiting such an approach is disclosed in U.S. Pat. No. 5,925,271, which is incorporated by reference herein in its entirety. Specifically, referring now to FIG. 1, the aforementioned patent discloses a spatial shaping device that includes stationary beam-shaping mirror 1 and rotary mirror 3. The device allows processing the surface of sample 7 with a homogenized dosage of laser beam exposure.

Laser beams can also be spatially shaped using a pre-programmable micromirror array to produce a spatial energy distribution suitable for marking, machining, and processing of materials. One example of a device exploiting such an approach is disclosed in U.S. Patent Application Publication No. 20020008091, which is incorporated by reference herein in its entirety. In this approach, the preprogrammed micromirror array redistributes the laser output beam energy to produce a desired two-dimensional machined pattern on a work piece. To create a special beam profile, this device uses a blocking diaphragm to adjust the intensity of every beamlet reflected from each single micromirror. One disadvantage of this approach is that this results in a large loss in the incident beam power. An additional disadvantage of this approach is the necessity to use complicated and expensive equipment to create the proper distribution of beam intensity.

WIPO Patent No. WO 01/04685 A1, which is incorporated by reference herein in its entirety, discloses an approach for producing a homogeneous intensity profile of a laser beam. In this approach, the laser beam impinges an optically addressable spatial light modulator whose local transmission or reflection properties depend in a non-linear manner on the local illumination intensity. Such a device in principle automatically generates an almost rectangular beam profile without any additional external influence. The basic disadvantage of this approach is that it results in a large loss in the incident beam power, a complicated device having a low damage threshold, and a necessity to exercise complicated control to create any special beam profile different from a homogeneous one.

U.S. Pat. No. 5,864,430, which is incorporated by reference herein in its entirety, proposes an approach that maps a Gaussian beam into a spatially shaped beam with a uniform irradiance profile by exploiting the Fourier transform properties of lenses. This approach does not require any controlling equipment and the approach has a rather high damage threshold. The basic disadvantage of this approach is that it operates only with an incident Gaussian beam and can be used only to form a few special profiles of the output beam.

It is therefore desirable to provide a system and method for spatial shaping of laser beams that overcomes the above-described shortcomings while retaining their advantages. In particular, it would be desirable to provide a system and method that can realize practically any spatial output beam shape without requiring complicated controlling equipment, without large losses in beam power, and/or without requiring a special distribution of the intensity of the initial (incident, raw, or input) laser beam.

SUMMARY OF THE INVENTION

The invention relates to methods and associated systems for the spatial shaping of laser beams. The methods and systems are based on creating a special distribution of diffraction efficiency density along a thick Bragg grating (BG). Diffraction efficiency density is the limit of the ratio of diffraction efficiency of thin BG layer to the thickness of this layer when this thickness tends to zero. The distribution of diffraction efficiency density should be such that an incident (raw or input) laser beam is diffracted from the different depths of the BG with varying efficiencies. In other words, the intensity across the diffracted beam in the plane of diffraction will be continuously varied in accordance with the distribution of the diffraction efficiency density in the BG. Thus, a proper pattern of diffraction efficiency density distribution along the BG's thickness is used to provide the needed spatial distribution of intensity across the beam. As such, embodiments of the present invention can provide practically any distribution of the intensity across the output beam because it is based on the application of a thick BG with a proper distribution of diffraction efficiency density along the depth or thickness of the BG. Therefore, any part of the input beam will give a contribution in the intensity distribution across the output beam in accordance with the distribution of the diffraction efficiency density.

In addition, because of the very narrow angular selectivity of the BGs in the plane of beam diffraction, the spatial noises of the laser beam can be filtered or cleaned out. That is, the narrow angular selectivity of BGs allows their use as spatial filters for excluding highly divergent components from an incident beam. Also, using two or more BGs, embodiments of the present invention allow for two-dimensional spatial beam shaping and cleaning.

In an exemplary embodiment of the present invention, a system for spatial beam shaping of an incident laser beam is provided. The system includes a laser beam source for providing the incident laser beam and a Bragg grating (BG) coupled to receive the incident laser beam from the laser beam source. The BG has a thickness that is not less than a cross sectional size of the incident laser beam in the plane of beam diffraction. The BG produces a diffracted beam from the incident laser beam, and the various depths within the BG include a distribution of diffraction efficiency density for spatially shaping the incident laser beam into the diffracted beam.

The system for spatial beam shaping of an incident laser beam may further include a second BG coupled to receive the diffracted beam from the first BG. The second BG may have a thickness that is not less than a cross sectional size of the beam diffracted from the first BG in the plane of beam diffraction in the second BG and may produce a diffracted second beam from the diffracted first beam. The second BG may be used to spatially shape the incident laser beam in a two-dimensional manner.

In addition, the BG may fragment the incident laser beam at various depths within the BG into a plurality of diffracted beams, and each of the plurality of diffracted beams may have a corresponding beam intensity and spatial shape.

In another exemplary embodiment of the invention, a method for spatial beam shaping of an incident laser beam from a source is provided. The method includes: providing a Bragg grating (BG) having a thickness that is not less than a cross sectional size of the incident laser beam in the plane of beam diffraction; directing the incident laser beam into the BG; and diffracting the incident laser beam at various depths within the BG into a corresponding diffracted beam, where the various depths within the BG include a distribution of diffraction efficiency density for spatially shaping the incident laser beam into the diffracted beam.

A more complete understanding of the holographic spatial laser beam shaper and method will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

These and other features, aspects and advantages of the present invention will be more fully understood when considered with respect to the following detailed description, appended claims, and accompanying drawings, wherein:

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The present invention is directed to systems and methods that spatially shape a raw laser beam by allowing the raw beam to diffract into a spatially shaped output beam and/or fragment into various beams with specified intensity and spatial shape of each beam. Then the beams can be used separately or combined in such a way as to provide a specified distribution of the beam intensity across an output beam. Embodiments of the present invention include a holographic or Bragg grating (BG) with a thickness comparable or larger than a cross section size of the raw (or incident) beam in the plane of beam diffraction. The BG can provide a continuous fragmentation of the input beam in accordance with a distribution of diffraction efficiency density along the thickness of the BG. As such, the embodiments of the present invention convert the distribution of the diffraction efficiency density into the specified distribution of beam intensity across the output beam.

A BG of the present invention is formed from materials that allow accurate variation of refractive index(es) and/or diffraction efficiency density along the BG thickness. In one embodiment, a BG of the present invention can be made by exposing a photorefractive lithium niobate (e.g., S. Breer, K. Buse. "Wavelength demultiplexing with volume phase holograms in photorefractive lithium niobate," Appl. Phys. B, v.66, pp. 339–345, 1998) to at least two laser beams to form a plurality of diffraction patterns. In another embodiment, a BG is made by exposing a photorefractive glass (e.g., O. M. Efimov, L. B. Glebov, L. N. Glebova, K. C. Richardson, and V. I. Smirnov. "High-efficiency Bragg gratings in photothermorefractive glass," Appl. Optics, Optical Technology and Biomedical Optics (OT&BO), v.38, pp. 619–627, 1999) to UV laser light source followed by thermal development to form a volume phase hologram.

Figure 2:
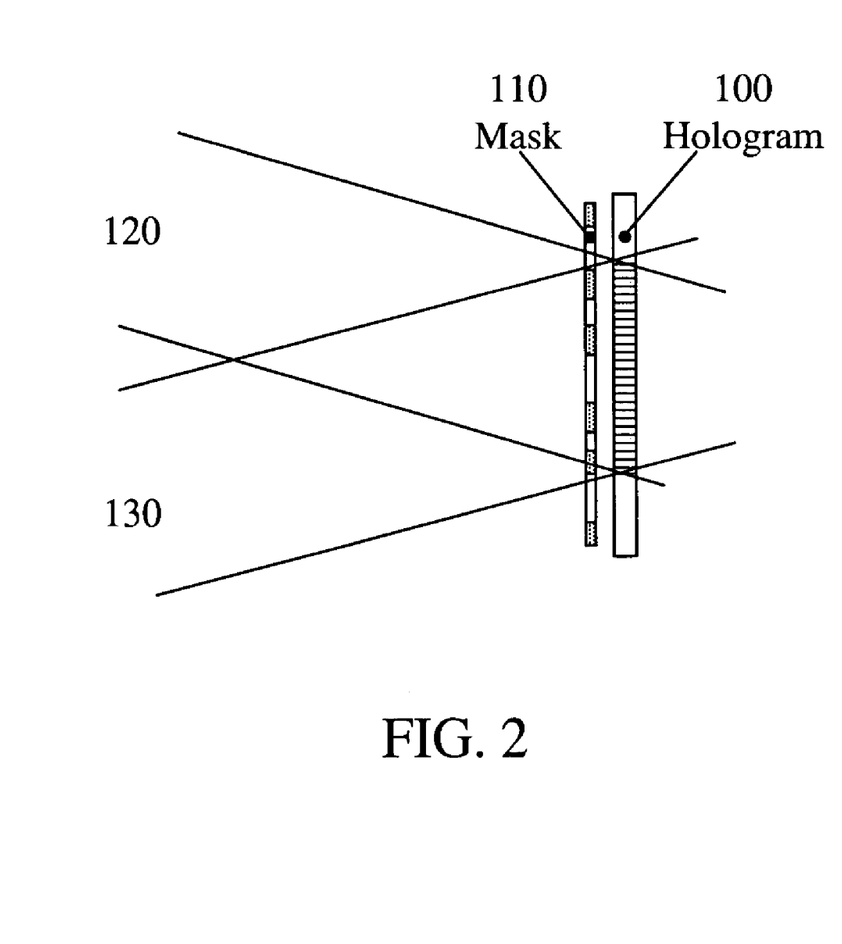
FIG. 2 is a schematic diagram of an exemplary embodiment for implementing refractive index modulation pursuant to aspects of the present invention.

Referring now to FIG. 2, an embodiment for implementing refractive index modulation during a recoding process is provided. The embodiment of FIG. 2 includes photosensitive material to record holographic grating or BG 100, first laser beam 120, second laser beam 130, and mask 110. Here, mask 110 is formed from a material having a proper distribution of absorption or reflection characteristics and is placed in front of BG 100 to modulate the exposure dosage of laser beams 120, 130 during the recording of BG 100 by laser beams 120, 130. As a result, the value(s) of refractive index(es) and/or diffraction efficiency density(ies) of BG 100 are also modulated.

The scope of the present invention, however, is not limited to the techniques and/or materials used to form or construct the above described BGs. Instead, all or some of the above described techniques and/or materials can be replaced by any suitable techniques and/or materials that are recognized by those skilled in the art.

Regardless of how a BG is formed, recorded, modulated, or constructed, embodiments of the present invention use the BG in a situation where a raw or incident beam is diffracted into a spatially shaped output beam and/or fragmented into various beams by diffracting them from different depths within the BG to spatially shape the intensity of each beams. In addition, then the beams can be combined in such a way as to provide a specified distribution of the intensity across an output beam.

Figure 3:
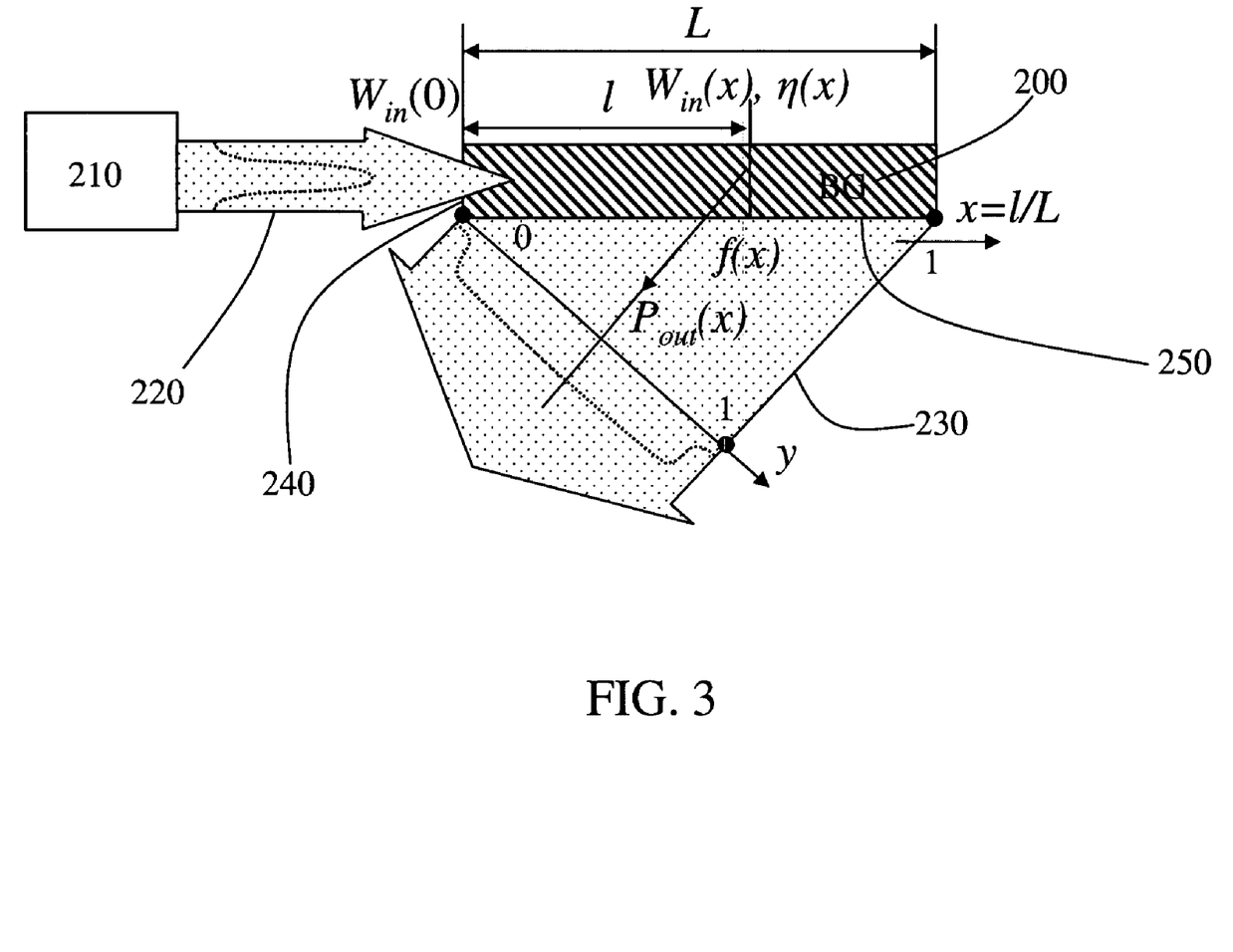
FIG. 3 is a schematic diagram of a thick Bragg grating (BG) spatial beam shaper according to an exemplary embodiment of the present invention.

In particular, referring now to FIG. 3, an embodiment of the present invention includes BG 200 and laser beam source 210 that provides input (or incident) laser beam 220. BG 200 has first side 240 and second side 250. In FIG. 3, input laser beam 220 is shown to enter BG 200 from first side 240 and spatially shaped (or diffracted) beam 230 is shown to be diffracted from second side 250. The diffraction efficiency density of BG 200 is changed with a depth, l, of beam penetration along the beam propagation direction. The changes (or the distribution) of the diffraction efficiency density along the depth, l, can be achieved by creating the proper distribution of the grating refractive index modulation in accordance with H. Kogelnik's coupled wave theory as disclosed in The Bell System Technical Journal, v.48, pp. 2909–2945, 1969, which is incorporated by reference herein in its entirety. However, the scope of the present invention is not limited by the above described wave theory and/or technique, and those skilled in the art would recognize that the diffraction efficiency density may be varied by other suitable wave theories and/or techniques. In the embodiment of FIG. 3, the power density of beam 230 diffracted from the depth, l, can be defined (or entirely or totally defined) by the power of input beam 220 and by the diffraction efficiency density around the depth, l. Thus, practically any one-dimensional distribution in the power density of diffracted beam 230 can be formed by a proper distribution of the refractive index modulation along the grating thickness of BG 200. To create a two-dimensional distribution of power densities, an additional BG should be used.

Figure 4:
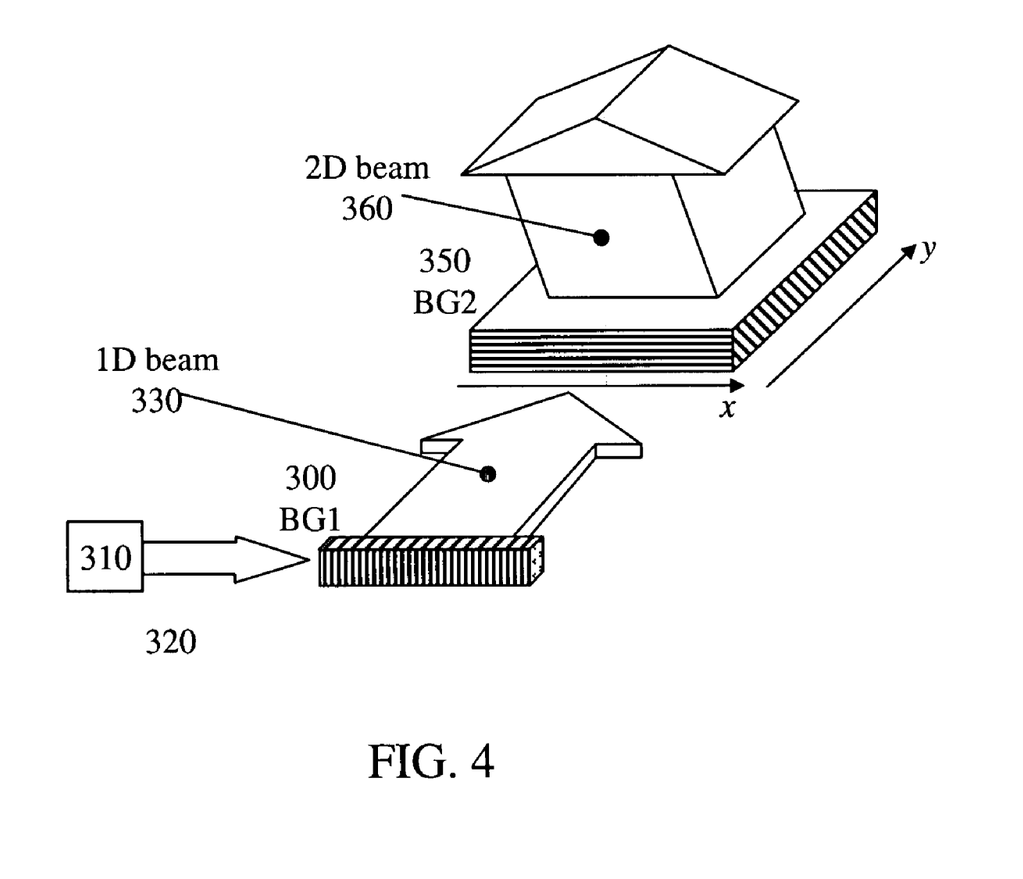
FIG. 4 is a schematic diagram of a thick BG spatial beam shaper to create a two-dimensional distribution according to an exemplary embodiment of the present invention.

Referring now to FIG. 4, an embodiment of the present invention includes first BG 300, second BG 350, and laser beam source 310 that provides input (or incident) laser beam 320. In FIG. 4, input laser beam 320 is shown to enter first BG 300 and one-dimensionally spatially shaped (or diffracted) beam 330 is shown to be diffracted from first BG 300. One-dimensionally spatially shaped beam 330 is then shown to enter second BG 350 and then diffracted from second BG 350 as two-dimensionally spatially shaped beam 360. As such, the first BG 300 is used to perform the proper distribution of power density in the direction, x, which will allow input beam 320 to reach the desired two-dimensional spatially shaped beam 360 after one-dimensionally spatially shaped beam 330 is diffracted in the second BG 350.

The embodiments shown in FIGS. 3 and 4 provide two distinct advantages over the above described prior approaches for spatial shaping of a laser input beam. First, the input beam is involved in the diffraction process as a whole; therefore, the intensity distribution across the diffracted beam does not depend on the intensity distribution across the input beam. That is, the redistribution of the input beam intensity over the output beam is done automatically. Second, if a BG is a phase grating and it is recorded in a material with low absorption and scattering, the efficiency of the input beam transformation into the beam with a specified intensity distribution can be close to about 100%.

Referring now back to FIG. 3, to describe the distribution of a BG's diffraction efficiency density along its thickness, an embodiment of the present invention defines this value as $H(l)=\eta(l)/\Delta(l)$, where, $\eta(l)$, is the diffraction efficiency of the layer with a thickness, $\Delta l$, placed on a depth, l, of BG 200. In an embodiment of the present invention, the concept "diffraction efficiency" should be applied only to a BG with a definite thickness and should not be used irrespective of it. Based on this concept, the diffraction efficiency density distribution can be easily and uniquely calculated if the specified intensity distribution, f(x), along a non-dimensional depth, $x=l/L$, of BG 200 or along a non-dimensional coordinate, y, across the resulting beam 230 is known (note: the result should be the same because $y \propto x$).

That is:

$$P_{out}(x) = k \cdot f(x) \qquad (1)$$

where, k, is a constant and, f(x), is a functional dependence. The constant, k, can be found from the normalizing condition:

$$k \cdot \int_0^1 f(x)\,dx = W_{in}(0) \qquad (2)$$

$$k = \frac{W_{in}(0)}{\int_0^1 f(x)\,dx}$$

It follows that the input beam power at the depth, x, of the grating is:

$$W_{in}(x) = W_{in}(0) - k \cdot \int_0^x f(x')\,dx' \qquad (3)$$

$$W_{in}(x) = W_{in}(0) \cdot \left(1 - \frac{\int_0^x f(x')\,dx'}{\int_0^1 f(x')\,dx'}\right)$$

Finally, the distribution of the diffraction efficiency density along the grating thickness is found from the ratio:

$$H(x) = \frac{P_{out}(x)}{W_{in}(x)} \qquad (4)$$

$$H(x) = \frac{f(x)}{\int_0^1 f(x')\,dx' - \int_0^x f(x')\,dx'}$$

As such, the diffraction efficiency density in the embodiment of FIG. 3 can be defined (or solely defined) by the functional dependence of the target distribution across beam 220.

Beam shapers are often used to produce a homogenization of laser beams. As an example, an embodiment of the present invention can create a one-dimensional homogeneous distribution of intensity across a beam. In this case, f(x), is constant; therefore, in accordance with (4), the diffraction efficiency density distribution is $$H(x) = \frac{1}{1-x}, \qquad (5)$$

where $0<x<1$. To convert this dependence into the distribution of the refractive index modulation along the BG thickness, the total thickness is divided into a number of layers, N, each with thickness, $\Delta x=1/N$. Then, the diffraction efficiency of the layer, n, (or n-th layer) can be calculated from $$\eta(x) = H(x) \cdot \Delta x \quad (6)$$
$$\eta_n[(n-1) \cdot \Delta x] = H[(n-1) \cdot \Delta x] \cdot \Delta x$$
$$\eta_n[(n-1) \cdot \Delta x] = \frac{1}{1-(n-1) \cdot \Delta x} \cdot \Delta x$$

Or, replacing $\Delta x=1/N$ $$\eta_n\left(\frac{n-1}{N}\right) = \frac{1}{N-n+1} \quad (7)$$

Figure 5:
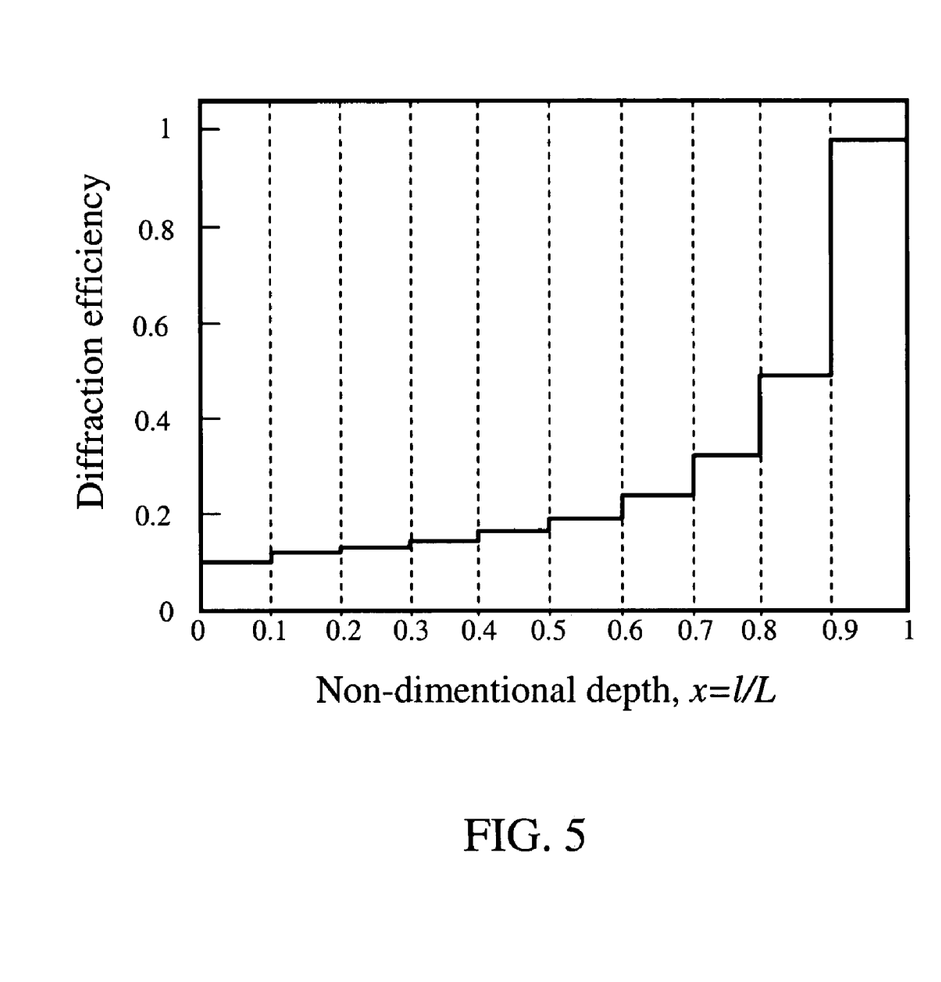
FIG. 5 is a distribution diagram of diffraction efficiencies of layers along the thickness of a thick BG pursuant to aspects of the present invention.

This dependence for N=10 is shown in FIG. 5. In this particular case, a power equal to one tenth of the total entering power is reflected by each single layer, providing continuous homogenization of the output beam. Using the data for the diffraction efficiency, the value of the refractive index modulation for each layer is calculated in accordance with H. Kogelnik's coupled wave theory. It should be apparent to those skilled in the art that the accuracy of the approximation of the refractive index distribution increases with the number of layers, N. Thus, the distribution of the refractive index modulation can be found very accurately for any target distribution of power density across the beam, using analytical or numerical calculations.

Further, as is shown in FIG. 5, the diffraction efficiencies of the most layers are rather low along such a BG and starts to be high only at the very end of the BG. This means that gratings without extremely high diffraction efficiencies can be used as the BG if losses of about 20–30% are permissible.

Embodiments of the present invention can be applied in many areas. For example, a one-dimensional homogenization of a laser beam intensity is very useful for shaping the beam of master-oscillators in laser systems with planar waveguide amplifiers. That is, embodiments of the present invention can function as an element for adjusting or shaping the master-oscillator beam which is used with a planar amplification system of high energy lasers. Embodiments of the present invention can also be used in other suitable high-energy laser systems, as well as in lithography, holography and other areas requiring a special profile of laser radiation.

Figure 6:
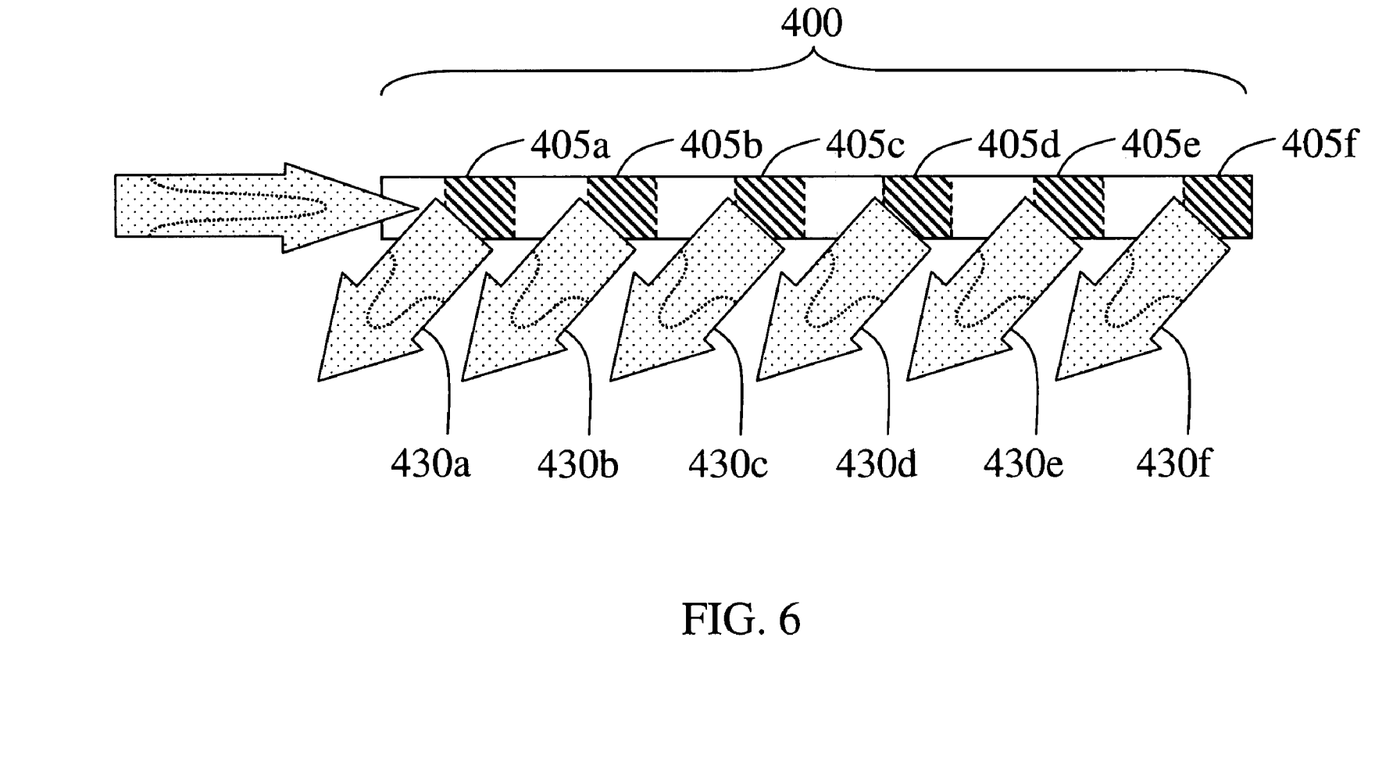
FIG. 6 is a schematic diagram of a thick BG spatial beam shaper used to split a laser beam into a number of beamlets according to an exemplary embodiment of the present invention.

Referring now to FIG. 6, in another embodiment of the present invention, thick BG 400 is used to split laser beam 420 into a number of beamlets 430a, 430b, 430c, 430e, 430f with identical or different spatial parameters. Such beam multiplication is very useful for material processing in the case when a number of details have to be treated simultaneously. This embodiment can be imagined in terms of a set of mirrors with different reflection coefficients; however, the embodiment does not require the adjustment of each individual mirror and can be used to create beams with different spatial shapes.

Analogous grating or BG 400 includes a set of high-efficient gratings 405a, 405b, 405c, 405d, 405e, 405f with different spatial frequencies that can be used as a wavelength division multiplexer (WDM) or demultiplexer because in this case, any single grating 405a, 405b, 405c, 405d, 405e, 405f can operate as a very narrowband mirror and reflect only one specific wavelength.

Further, such a grating 405a, 405b, 405c, 405d, 405e, 405f with a proper distribution of frequency (discrete or continuous) along the BG thickness can operate as a spectral element; moreover, any wavelength alteration in the output beam can be done (in contrast to usual spectral elements, which allow only a monotone change of a wavelength across the beam). In addition, all of the beams with different wavelengths can now propagate parallel to each other if the grating vectors have the same direction (in other words, if all the recorded layers are parallel to each other). Of course, a different spatial shaping of each single wavelength can be performed simultaneously if a few overlapped or separated gratings are recorded along the BG thickness.

In general and according to the forgoing, certain embodiments of the present invention allow both one- and two-dimensional laser beam shaping, are very flexible in producing practically any shape of output beam, have no restrictions for the input beam profile, and have a very high efficiency of beam conversion.

In addition, while certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. For example, glass type and gelatin type BG's have been illustrated, but it should be apparent that the inventive concepts described above would be equally applicable to other types of BGs and/or other suitable gratings. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method for spatial beam shaping of an incident laser beam from a source, the method comprising:
   providing a Bragg grating (BG) having a thickness that is not less than a cross sectional size of the incident laser beam in a plane of a beam diffraction;
   directing the incident laser beam into the BG; and
   diffracting the incident laser beam at various depths within the BG into a corresponding diffracted beam,
   wherein the various depths within the BG have a distribution of a refractive index modulation to provide a distribution of a diffraction efficiency density for spatially shaping the incident laser beam into the diffracted beam.

2. The method of claim 1, wherein the distribution of the diffraction efficiency density of the BG is used to produce a homogenization of the incident laser beam.

3. The method of claim 1, wherein the diffracting the incident beam at the various depths within the BG into the diffracted beam comprises fragmenting the incident beam at the various depths within the BG into a plurality of diffracted beams.

4. The method of claim 3, wherein each of the plurality of diffracted beams corresponds to a specified beam intensity and shape.

5. The method of claim 4, further comprising:
   combining the plurality of diffracted beams to form a specified output beam.

6. The method of claim 3, wherein the incident beam comprises a plurality of beam wavelengths and wherein each of the plurality of diffracted beams corresponds to one of the specified beam wavelengths.

7. The method of claim 6, wherein the diffracted beams overlap.

8. The method of claim 1, wherein the providing the BG comprises:
   forming a mask on a side of a photosensitive material;
   directing at least two recording laser beams into the mask; and
   exposing the photo sensitive material to the at least two recording laser beams after the recording beams have passed through the mask,
   wherein the mask has predetermined photo-distribution characteristics to form the distribution of the diffraction efficiency density of the BG in the photo sensitive material.

9. The method of claim 1, wherein the diffracting the incident beam at the various depths within the BG into the diffracted beam comprises fragmenting the incident beam at the various depths within the BG into a plurality of parallel diffracted beams.

10. The method of claim 1, wherein the providing the BG comprises:
    forming a mask on a side of a photosensitive material;
    directing at least two recording laser beams into the mask; and
    exposing the photo sensitive material to the at least two recording laser beams after the recording beams have passed through the mask,
    wherein the mask has predetermined photo-distribution characteristics to form the distribution of the refractive index modulation of the BG in the photo sensitive material.

11. A method for spatial beam shaping of an incident laser beam from a source, the method comprising:
    providing a Bragg grating (BG) having a thickness that is not less than a cross sectional size of the incident laser beam in a plane of a beam diffraction;
    directing the incident laser beam into the BG; and
    diffracting the incident laser beam at various depths within the BG into a corresponding diffracted beam,
    wherein the various depths within the BG have a distribution of a diffraction efficiency density for spatially shaping the incident laser beam into the diffracted beam,
    wherein the distribution of the diffraction efficiency density, H(x), for spatially shaping the incident laser beam into the diffracted beam, is determined by:

$$H(x) = \frac{f(x)}{\int_0^1 f(x')\,dx' - \int_0^x f(x')\,dx'},$$

wherein f(x) is a functional dependence of the specified intensity distribution along a non-dimensional thickness, $x=l/L$, of the BG, and
wherein l is the local depth and L is the total thickness of the BG.

12. A method for spatial beam shaping of an incident laser beam from a source, the method comprising:
    providing a Bragg grating (BG) having a thickness that is not less than a cross sectional size of the incident laser beam in a plane of a beam diffraction;
    directing the incident laser beam into the BG; and
    diffracting the incident laser beam at various depths within the BG into a corresponding diffracted beam,
    wherein the various depths within the BG have a distribution of a diffraction efficiency density for spatially shaping the incident laser beam into the diffracted beam,
    wherein the total thickness of the BG is divided into a number of layers, N,
    wherein a diffraction efficiency, $$\eta_n\left(\frac{n-1}{N}\right),$$

of a layer, n, of the BG satisfies:

$$\eta_n\left(\frac{n-1}{N}\right) = \frac{1}{N-n+1}.$$

13. A method for spatial beam shaping of an incident laser beam from a source, the method comprising:
    providing a first Bragg grating (BG) having a thickness that is not less than a cross sectional size of the incident laser beam in a plane of a beam diffraction;
    directing the incident laser beam into the first BG; and
    diffracting the incident laser beam at various depths within the first BG into a corresponding first diffracted beam;
    wherein the various depths within the first BG have a distribution of a diffraction efficiency density for spatially shaping the incident laser beam into the first diffracted beam;
    providing a second BG;
    directing the first diffracted beam into the second BG;
    diffracting the first diffracted beam at various depths within the second BG into a corresponding second diffracted beam;
    wherein the second BG and the first BG spatially shape the incident laser beam in a two-dimensional manner.

14. The method of claim 13, wherein the second BG comprises a thickness that is not less than a cross sectional size of the first diffracted beam in a plane of a second beam diffraction.

15. A system for spatial beam shaping of an incident laser beam, the system comprising:
    a laser beam source for providing the incident laser beam; and
    a Bragg grating (BG) coupled to receive the incident laser beam from the laser beam source, the BG having a thickness that is not less than a cross sectional size of the incident laser beam in a plane of a beam diffraction and producing a diffracted beam from the incident laser beam,
    wherein the various depths within the BG have a distribution of a refractive index modulation to provide a distribution of a diffraction efficiency density for spatially shaping the incident laser beam into the diffracted beam.

16. The system of claim 15, wherein the BG fragments the incident laser beam at various depths within the BG into a plurality of diffracted beams and wherein each of the plurality of diffracted beams has a corresponding beam intensity, wavelength, and shape.

17. The system of claim 15, wherein the BG comprises a material selected from a group consisting of photo sensitive materials.

18. The system of claim 15, wherein the BG further filters out spatial noises from the incident laser beam.

19. The system of claim 15, wherein the diffracted beam comprises a plurality of parallel diffracted beams.

20. A system for spatial beam shaping of an incident laser beam, the system comprising:
  a laser beam source for providing the incident laser beam; and
  a first Bragg grating (BG) coupled to receive the incident laser beam from the laser beam source, the first BG having a thickness that is not less than a cross sectional size of the incident laser beam in a plane of a beam diffraction and producing a first diffracted beam from the incident laser beam,
  wherein the various depths within the first BG have a distribution of a diffraction efficiency density for spatially shaping the incident laser beam into the first diffracted beam;
  a second BG coupled to receive the first diffracted beam from the first BG, the second BG having a thickness that is not less than a cross sectional size of the first diffracted beam in a plane of a second beam diffraction and producing a second diffracted beam from the first diffracted beam,
  wherein the second BG and the first BG spatially shape the incident laser beam in a two-dimensional manner.

21. The system of claim 20, wherein the various depths within the second BG comprise a distribution of a diffraction efficiency density for spatially shaping the first diffracted beam into the second diffracted beam.

22. A system for spatial beam shaping of an incident laser beam from a laser beam source, the system comprising:
  means for providing a Bragg grating (BG) with a distribution of a refractive index modulation to provide a distribution of a diffraction efficiency density;
  means for directing the incident laser beam into the BG, the BG having a thickness that is not less than a cross sectional size of the incident laser beam in a plane of a beam diffraction; and
  means for diffracting the incident laser beam within the BG into a corresponding diffracted beam,
  wherein the distribution of the diffraction efficiency density provided by the distribution of the refractive index modulation spatially shapes the incident laser beam into the diffracted beam.

23. The system of claim 22, wherein the diffracting means comprises means for fragmenting the incident laser beam at various depths within the BG into a plurality of diffracted beams and wherein each of the plurality of diffracted beams has a corresponding beam intensity, wavelength, and shape.

24. The system of claim 22, further comprising:
  means within the BG for filtering out spatial noises from the incident laser beam.

* * * * *